United States Patent
Lipinski

(10) Patent No.: US 9,151,512 B2
(45) Date of Patent: Oct. 6, 2015

(54) VENTILATION SYSTEM

(75) Inventor: Thomas Lipinski, London (GB)

(73) Assignee: Ventive Limited, London (GB)

( * ) Notice: Subject to any disclaimer, the term of this patent is extended or adjusted under 35 U.S.C. 154(b) by 1214 days.

(21) Appl. No.: 13/044,719

(22) Filed: Mar. 10, 2011

(65) Prior Publication Data

US 2011/0223848 A1  Sep. 15, 2011

(30) Foreign Application Priority Data

Mar. 10, 2010 (GB) .................................. 1004009.5

(51) Int. Cl.
| | |
|---|---|
| *F24F 12/00* | (2006.01) |
| *F28D 7/00* | (2006.01) |
| *F24F 7/02* | (2006.01) |
| *F24F 7/04* | (2006.01) |
| *F28D 7/10* | (2006.01) |
| *F28F 13/08* | (2006.01) |
| *F23L 17/02* | (2006.01) |
| *F28D 21/00* | (2006.01) |

(52) U.S. Cl.
CPC ............... *F24F 12/006* (2013.01); *F23L 17/02* (2013.01); *F24F 7/02* (2013.01); *F24F 7/04* (2013.01); *F28D 7/0008* (2013.01); *F28D 7/106* (2013.01); *F28F 13/08* (2013.01); *F28D 21/0014* (2013.01); *Y02B 30/563* (2013.01); *Y10T 29/49826* (2015.01)

(58) Field of Classification Search
CPC .................................................... Y02B 30/542
USPC ........................................... 165/54, 154, 164
See application file for complete search history.

(56) References Cited

U.S. PATENT DOCUMENTS

| | | | | |
|---|---|---|---|---|
| 1,920,059 A | * | 7/1933 | Buschbaum .................... | 165/44 |
| 2,420,757 A | * | 5/1947 | Neumann et al. .............. | 165/155 |
| 2,488,333 A | * | 11/1949 | Schlachter ...................... | 165/54 |
| 2,616,530 A | * | 11/1952 | Horowitz ........................ | 165/79 |

(Continued)

FOREIGN PATENT DOCUMENTS

| | | |
|---|---|---|
| CH | 678443 A5 | 9/1991 |
| DE | 27 20 569 A1 | 11/1978 |

(Continued)

OTHER PUBLICATIONS

European Search Report dated Oct. 15, 2012 in corresponding European Application No. 11 16 7651.

(Continued)

*Primary Examiner* — Allen Flanigan
(74) *Attorney, Agent, or Firm* — Ohlandt, Greeley, Ruggiero & Perle, L.L.P.

(57) ABSTRACT

A ventilation system including a heat recovery assembly having a first heat exchanger for heat recovery with a first flow path and a second flow path to exchange heat energy from air transported in one of paths to the other. A peripheral inlet to the first flow path is arranged to surround a central outlet of the second flow path and a peripheral inlet to the second flow path is arranged to surround a central outlet of the first flow path. The assembly further includes a peripheral outlet and a central inlet, the peripheral outlet arranged to surround the central inlet, and the heat recovery assembly is arranged such that air entering the peripheral inlet of the first flow path exits by the peripheral outlet; and air entering the central inlet will exit by the central outlet of the second flow path.

17 Claims, 4 Drawing Sheets

(56) References Cited

U.S. PATENT DOCUMENTS

| | | | |
|---|---|---|---|
| 3,557,681 A * | 1/1971 | Kristiansen | 454/249 |
| 3,584,682 A * | 6/1971 | Leedham et al. | 165/164 |
| 4,184,538 A * | 1/1980 | Rauenhorst | 165/66 |
| 4,846,261 A * | 7/1989 | Kittila | 165/54 |
| 4,889,181 A * | 12/1989 | Meijer | 165/78 |
| 4,915,164 A * | 4/1990 | Harper, Jr. | 165/164 |
| 5,000,081 A * | 3/1991 | Gilmer | 454/252 |
| 5,435,377 A * | 7/1995 | Kratochvil | 165/54 |
| 6,742,516 B2 * | 6/2004 | McCarren | 126/504 |

FOREIGN PATENT DOCUMENTS

| | | |
|---|---|---|
| DE | 4410434 A1 | 9/1995 |
| DE | 29515240 U1 | 12/1995 |
| DE | 19852640 A1 | 11/1999 |
| DE | 202005011970 U1 | 4/2006 |
| DE | 102005035712 A1 | 2/2007 |
| GB | 2 432 208 A | 5/2007 |
| JP | 62000791 A | 1/1987 |
| NL | 7902575 A | 10/1980 |
| UA | 27057 U | 10/2007 |
| WO | 82/00336 | 2/1982 |
| WO | 9108425 A1 | 6/1991 |
| WO | 2009/106854 A1 | 9/2009 |
| WO | 2010069602 A2 | 6/2010 |

OTHER PUBLICATIONS

Search Report dated Apr. 29, 2010 from GB 1004009.5.

Search Report dated Jun. 16, 2010 from GB 1004009.5.

* cited by examiner

VENTILATION SYSTEM

CROSS REFERENCE TO RELATED APPLICATIONS

This application claims benefit under 35 U.S.C. §119(a) of Great British Patent Application No. GB 1004009.5, filed Mar. 10, 2010, the entire contents of which are incorporated herein by reference.

BACKGROUND OF THE INVENTION

1. Field of the Invention

This invention relates to a ventilation system. In particular, it relates to a passive ventilation system with heat recovery for a building. It also relates to a heat exchange for a heat recovery ventilation system. The invention also relates to a method of installing a ventilation system in a building.

2. Description of Related Art

As buildings are becoming better insulated and more airtight, the need for adequate ventilation, to maintain a healthy indoor environment, is important. As many buildings are heated to temperatures above that of the outside temperature, ventilation systems can be the source of significant heat loss. Thus, warm "stale" air from inside the building is vented to the atmosphere, while colder "fresh" air is drawn in from outside. The building's heating system then has to work harder to warm the incoming cold air and maintain an even temperature.

Ventilation systems with heat recovery are known. These systems comprise an outflow duct and an inflow duct and a heat exchange. A first electric fan is used to move air from inside the building to the outside through the outflow duct, while a second electric fan is used to bring fresh air inside through the inflow duct. The heat exchange comprises a region where the inflow duct and outflow duct are separated by a thin membrane that allows heat transfer therethrough. Thus, the warm outgoing air is used to heat the cooler incoming air. These systems have been shown to be able to recover up to 80% of the energy of the outgoing air. These systems can therefore provide ventilation without a significant effect on heating requirement. However, if we take account of the electricity used by the fans, the overall saving in energy usage is very small.

For example, in a typical dwelling of 150 m² with a standard ventilation system operating at 60 liters per second, and assuming an average 10 degree temperature difference between the inside and outside temperatures will increase the energy usage by 5140 kWh. Using a heat recovery ventilation system will save approximately 4100 kWh (i.e. 80%). However, a typical known heat recovery system will use approximately 900 kWh in electricity for the fans. Thus, the total saving in energy consumption is very small.

BRIEF SUMMARY OF THE INVENTION

According to a first aspect of the invention, we provide a ventilation system including a heat recovery assembly comprising a first heat exchanger for heat recovery having a first flow path and a second flow path, the heat exchanger adapted to exchange heat energy from air transported in one of the first or second flow paths to the air transported in the other flow path, wherein a peripheral inlet to the first flow path is arranged to surround a central outlet of the second flow path, and a peripheral inlet to the second flow path is arranged to surround a central outlet of the first flow path, wherein the heat recovery assembly is further adapted and arranged such that air entering the peripheral inlet of the first flow path exits by a peripheral outlet and air entering a central inlet will exit by the central outlet of the second flow path.

This is advantageous as the arrangement of the heat recovery assembly provides efficient heat transfer and minimal disruption to air flowing along the first or second flow paths. By ensuring minimum disruption to the air flow means that air flows freely without hindrance through the heat exchange. This enables the heat recovery ventilation system to operate passively using the passive stack effect and the wind, thereby obviating the need for powered fans. Further, the peripheral outlet and the central inlet, wherein the peripheral outlet is arranged to surround the central inlet, provides an advantageous means for connecting the heat exchange of the ventilation system to further conduits.

Preferably the inlet for the first flow path is annular and surrounds the outlet for the second flow path. Thus, the outlet for the second flow path may be circular.

Preferably the inlet for the second flow path is annular and surrounds the outlet for the first flow path. Thus, the outlet for the first flow path may be circular.

Thus, the first flow path starts at the periphery of the heat exchanger and converges to the centre and the second starts at the periphery of the heat exchange and converges to the centre (extending in substantially the opposite direction through the heat exchange).

Preferably, the heat recovery assembly comprises the first heat exchanger and a second heat exchanger connected to the first heat exchanger in series, the second heat exchanger comprising a third flow path and a fourth flow path, the heat exchanger adapted to exchange heat energy from the air transported in one of the third or fourth flow paths to the air transported in the other flow path, the inlet of the third flow path is surrounded by the outlet of the fourth flow path, and the inlet for the fourth flow path is surround by the outlet of the third flow path; the first and second heat exchanges being arranged such that the first flow path and the third flow path are continuous and the second flow path and the fourth flow path are continuous. This is advantageous as two heat exchanges can be placed end to end, which provides little resistance to air flow and provides a convenient arrangement for connection to further conduits and the like. In particular, the arrangement of the inlets and outlets to the heat recovery assembly is particularly important to ensure efficient operation.

Thus, the air entering the "peripheral" inlet of the heat recovery assembly exits by the "peripheral" outlet. Similarly, the air entering the "central" inlet will exit by the "central" outlet. This arrangement is particularly advantageous as it allows a minimum of connections to ducting and is simple to install.

Preferably the fourth and second flow paths are adapted to carry the air leaving the ventilation system to atmosphere and the first and third flow paths are adapted to carry the air entering the ventilation system from atmosphere into the building.

Preferably the ventilation system includes a ventilation aperture element providing an outlet for air leaving the ventilation system and an inlet to air entering the ventilation system, the ventilation aperture element having an exhaust pipe to channel air leaving the ventilation system and at least one funnel mounted around the periphery of the exhaust pipe for collecting air to enter the ventilation system, the at least one peripheral funnel adapted to be connected to the inlet of the first flow path and the exhaust pipe adapted to connect to the outlet of the second flow path.

Preferably the ventilation aperture element includes a plurality of funnels mounted around the periphery of the exhaust pipe, each funnel facing a different direction. This is advantageous as one of the plurality of funnels will always face the wind and therefore be able to effectively channel air into the ventilation system. Further, the peripheral mounting of the funnels results in a simple connection to the "peripheral" inlet of the first flow path.

Preferably the ventilation aperture element includes a cap element adjacent but spaced from an opening of the exhaust pipe, the cap element including a projection that projects towards the opening of the exhaust pipe.

Preferably, the ventilation system is adapted to be mounted within a chimney of a building, the chimney comprising a chimney top adjacent the roof of the building and at least one chimney aperture that opens into a room of the building, the chimney aperture and chimney top being connected by a chimney void, the heat recovery assembly adapted to be received within the chimney void and the ventilation aperture element adapted to be sealingly connected to the chimney top. This is advantageous as the ventilation system makes good use of the building's structure so that it is easy to install. Accordingly, the ventilation aperture element may include a sealing element so that it sealingly connects to the chimney.

Preferably, the inlet of the fourth flow path is adapted to be connected to an outgoing air duct which receives air from a room in the building. The outlet of the third flow path may be adapted to be open to the chimney void. Thus, only one duct is required to connect the heat exchange to the room where ventilation is required.

According to a second aspect of the invention, we provide a heat exchanger for a heat recovery ventilation system having a first flow path and a second flow path, the heat exchanger adapted to exchange heat energy from the air transported in one of the first or second flow paths to the air transported in the other flow path, wherein a peripheral inlet to the first flow path is arranged to surround a central outlet of the second flow path, and a peripheral inlet to the second flow path is arranged to surround a central outlet of the first flow path, wherein the heat exchanger is further adapted and arranged such that air entering the peripheral inlet of the first flow path exits by a peripheral outlet and air entering a central inlet will exit by the central outlet of the second flow path.

This is advantageous as the heat exchange is compact and can be fitted in most existing buildings. Further, the arrangement of the first flow path and second flow path provides little resistance to the flow of air through the device while achieving high efficiency.

Preferably the heat exchanger is cylindrical. Preferably the inlet for the first flow path is ring-shaped and surrounds the circular outlet of the second flow path, and the inlet for the second flow path is ring-shaped and surrounds the outlet of the first flow path. This is advantageous as the circular outlet and circular inlet can easily connect to ducting of circular cross-section, which is commonly used.

Preferably, the first flow path comprises a plurality of channels arranged in a loop at the inlet, the channels arranged to converge to the outlet. Similarly, the second flow path comprises a plurality of channels arranged in a loop at the inlet that converge to the outlet. This is advantages because as the channels of the first flow path converge and the channels of the second flow path converge, the paths intimately cross over one another, which promotes efficient heat transfer without hindering the air flow.

According to a third aspect of the invention we provide a method of installing a ventilation system as defined in the first aspect of the invention in a chimney of a building, the chimney comprising a chimney top adjacent the roof of the building and at least one chimney aperture that opens into a room of the building, the chimney aperture and chimney top being connected by a chimney void, comprising the steps of; a) mounting a ventilation aperture element at the chimney top, the ventilation aperture element providing an outlet for air leaving the ventilation system and an inlet to air entering the ventilation system; b) mounting a heat recovery assembly within the chimney; c) connecting an outgoing air duct between the heat recovery assembly and a room in the building; d) arranging the ventilation system such that the chimney void forms an incoming air duct for the ventilation system to transport air entering the ventilation aperture element to a room through the chimney aperture.

This is advantageous as the ventilation system comprises the minimum of installation work. Only one hole is required to be made within the building to receive the outgoing air duct. The remainder of the installation work is performed at the chimney top, which requires the insertion of the heat recovery assembly into the chimney and sealing of the ventilation aperture element with the chimney top.

Preferably, the ventilation aperture element and heat recovery element are preassembled. This makes installation even simpler.

Preferably, the outgoing air duct is mounted higher within a room of the building than the chimney aperture. This allows the ventilation system to operate most efficiently, as the warmer air in the room will rise into the outgoing air duct.

Preferably, the chimney aperture is a disused fireplace. Preferably the ventilation aperture element replaces a chimney pot at the chimney top. Thus, this method of installation and ventilation system is advantageous for retrofitting to many houses with unused chimneys.

According to a fourth aspect of the invention we provide a heat exchanger for a heat recovery ventilation system having a first flow path comprising a first set of channels and a second flow path comprising a second set of channels, the heat exchanger adapted to exchange heat energy from air transported in one of the first or second flow paths to the air transported in the other flow path, the heat exchange comprises a plurality of walls extending radially from a centre point, the walls defining the channels that form the first and second flow paths, each wall comprising an inner wall portion and an outer wall portion, the inner wall portion located closer to the centre point than the outer wall portion, wherein at a first end, adjacent walls are arranged to alternately abut over either their outer wall portion or their inner wall portion, such that openings to a first set of channels are formed between the outer wall portions and openings to a second, separate, set of channels are formed between the inner wall portions; and at a second end, adjacent walls are arranged to alternately abut over either their outer wall portion or their inner wall portion, such that openings to the first set of channels are formed between the inner wall portions and openings to the second set of channels are formed between the outer wall portions.

This is advantageous as the heat exchanger provides an efficient transfer of energy between the flow paths without substantially hindering the flow therethrough.

Preferably the heat exchanger is cylindrical and, at the first end, the openings to the first set of channels are arranged in ring and surround the openings to the second set of channels; and at the second end, the openings to the second set of channels are arranged in ring and surround the openings to the first set of channels.

Preferably the plurality of walls abut only at the first end and the second end and are substantially separate between the first end and the second end.

DETAILED DESCRIPTION OF THE INVENTION

Figure 1:
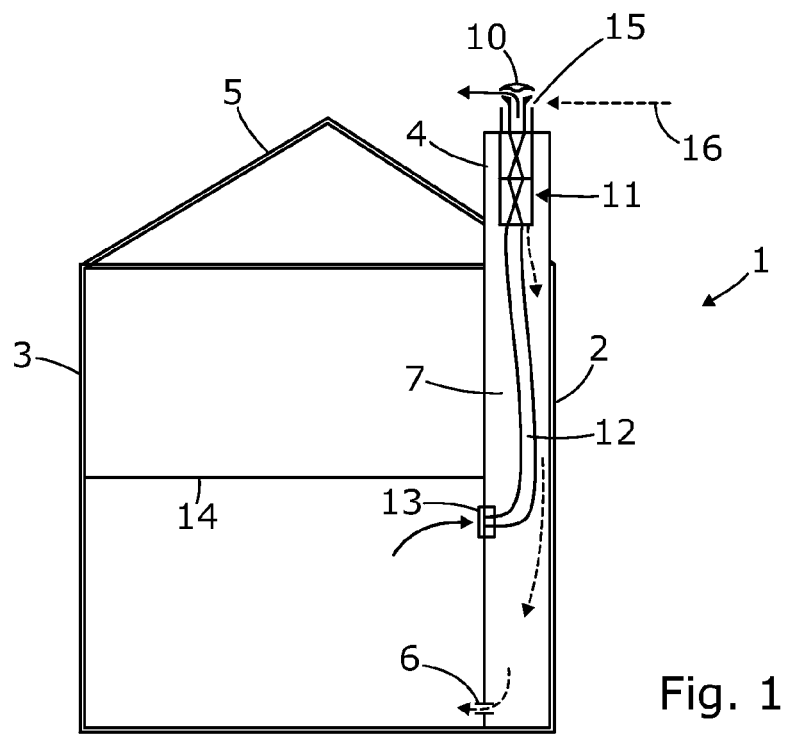
FIG. 1 shows a diagrammatical view of the ventilation system mounted within a chimney.

FIG. 1 shows an embodiment of a heat recovery ventilation system 1, mounted within a chimney 2 of a house 3. The chimney comprises a chimney top 4 that projects from a roof 5 of the house 3, a chimney aperture 6 and a chimney void 7 that connects the chimney top 4 and chimney void 7. The chimney aperture 6 comprises a fireplace. This ventilation system is particularly suited to being mounted within an existing chimney.

The ventilation system 1 comprises a ventilation aperture element 10, a heat recovery assembly 11 and an outgoing air duct 12. The outgoing air duct 12 is connected between the heat recovery assembly 11 and a vent 13, which opens into a room of the house 3, near the ceiling 14. The vent 13 is mounted higher than the chimney aperture 6. This allows the ventilation system to make use of the passive stack effect in which warmer air rises over cooler air. Therefore, the vent 13 will receive a flow of rising warm air, which will naturally enter the ventilation system without the need of a fan. The vent may be adjustable to provide control of the amount of air that can enter the ventilation system from the room. The warm air will rise through the outgoing air duct 12, through the heat recovery assembly 11 and out of the ventilation aperture element 10. The ventilation aperture element 10 includes a plurality of funnels 15, which are shaped to smoothly channel air into the ventilation system 1. The funnels 15 collect fresh air as the wind (represented by dashed arrow 16) blows air past the ventilation aperture element 10. The fresh incoming air is urged through the heat recovery assembly 11 by the wind pressure and into the chimney void 7. The fresh air then enters the room by the chimney aperture 6.

The chimney aperture 6 may comprise the whole open fireplace but, in this embodiment, the fireplace is closed off and a small vent is placed in the fireplace.

Figure 2:
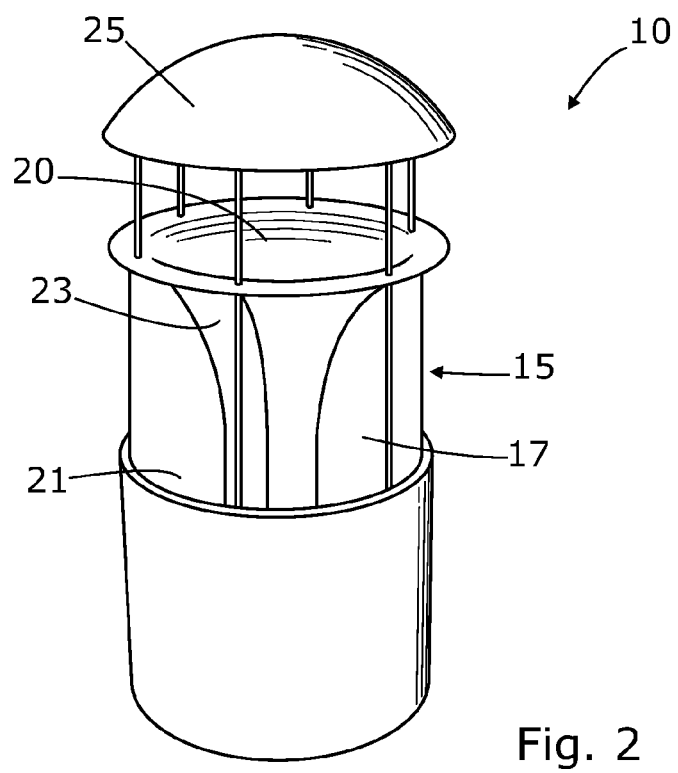
FIG. 2 shows a perspective view of an embodiment of a ventilation aperture element.
Figure 3:
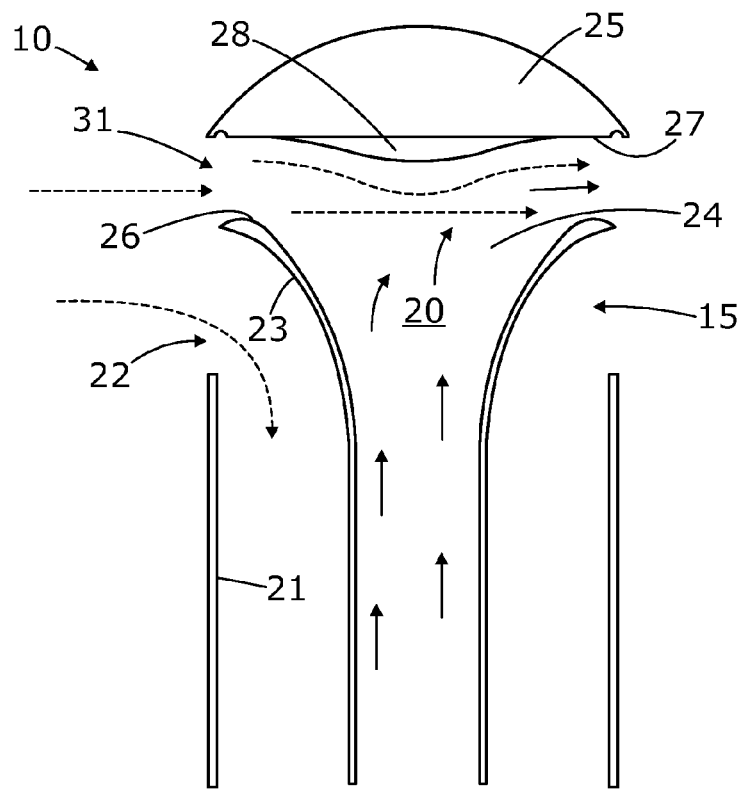
FIG. 3 shows a cross section of the ventilation aperture element shown in FIG. 2.

FIG. 2 shows an embodiment of the ventilation aperture element 10 and FIG. 3 shows a cross-section therethrough. The ventilation aperture element 10 comprises an exhaust pipe 20 that is arranged to extend vertically and terminates in an exhaust pipe opening 24. The plurality of funnels 15 are arranged around the outside of the exhaust pipe 20 and face different directions, which ensures that at least one of them will face the wind. In this embodiment there are six funnels separated by narrow fins 17. Each funnel 15 comprises a funnel channel 21 that extends parallel to the exhaust pipe 20 and a funnel opening 22 that faces horizontally. Each funnel channel 21 includes a curved deflector surface 23 opposite the funnel opening 22. The deflector surface 23 is shaped to smoothly deflect the air entering the funnel opening 22 from its substantially horizontal flow direction to a vertically downward flow direction into the ventilation system 1. The channels 21 narrow as they extend downward to increase the flow rate even when wind speed is low.

The ventilation aperture element 10 also includes a cap 25 adjacent and opposite the exhaust pipe opening 24 but spaced therefrom. The ventilation aperture element 10 includes a wide rim 26 around the exhaust pipe opening 24. The outer edge of the rim 26, distal from the exhaust pipe opening 24, forms part of the funnel openings 22. The cap 25 extends over the opening 24 and the rim 26, and shields the exhaust pipe 20 from the ingress of rain. The base 27 of the cap 25, which faces the opening 24, is arranged substantially parallel to the rim 26 and forms a cap flow path 31 for the wind to flow through. However, the base 27 includes a domed projection 28 opposite the exhaust pipe opening 24. The projection 28 forms a restriction in the flow path which causes the wind flow to curve around it as shown by dashed arrow 29. The flow of wind through the cap flow path 31 draws air out of the exhaust pipe 20. The projection 28 enhances this by causing a localised decrease in pressure as the wind flows over it and is drawn along its surface by the Coanda effect. The projection 28 is symmetrical but could be asymmetric to improve the draw of air from the exhaust pipe 20 if the wind was predominately from one direction for instance. The cap 25 also has a domed top surface 30, which allows rain to drain off easily without entering the exhaust pipe 20.

Figure 4:
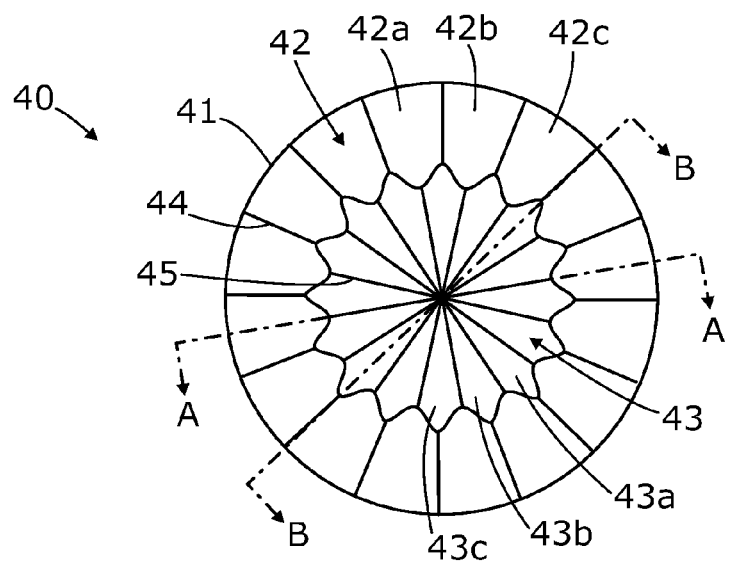
FIG. 4 shows an end view of an embodiment of a heat exchange.
Figure 5A:
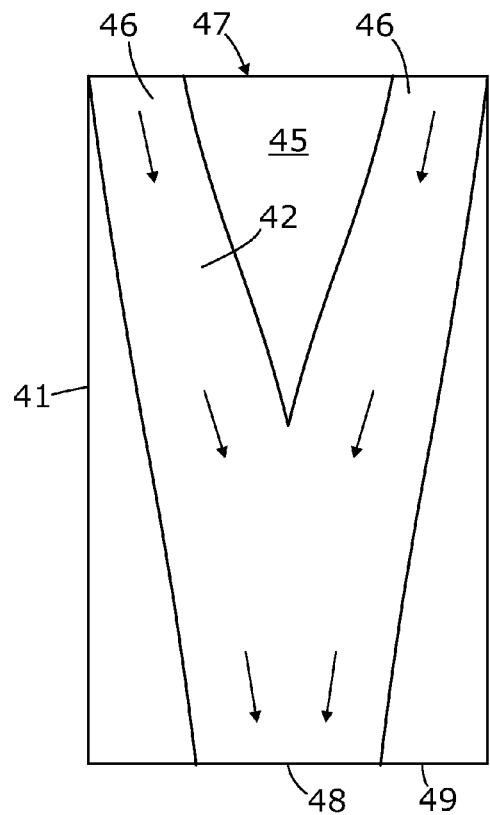
FIG. 5a shows a cross section through the heat exchange of FIG. 4 along the line A-A.
Figure 5B:
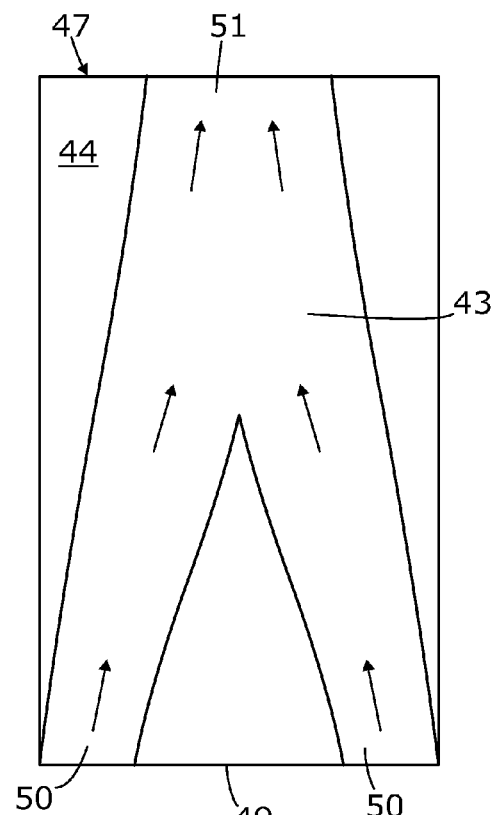
FIG. 5b shows a cross section through the heat exchange of FIG. 4 along the line B-B.

FIG. 4 shows an end view of a heat exchange 40 that forms part of the heat recovery assembly 11. The heat exchange 40 comprises a cylindrical body 41 having a first flow path 42 and a second flow path 43 therethrough (shown most clearly in FIGS. 5a and 5b). The first flow path 42 is divided into a plurality of channels 42a, 42b, 42c, and so on, by dividers 44. The second flow path 43 is divided into a plurality of channels 43a, 43b, 43c, and so on, by dividers 45. The first flow path 42 includes an inlet 46 at a first end 47 of the cylindrical heat exchange 40 and an outlet 48 at the other end 49 of the cylindrical heat exchange 40. The second flow path 43 includes an outlet 51 at the first end 47 of the cylindrical heat exchange 40 and an inlet 50 at the other end 49 of the cylindrical heat exchange 40.

The inlet 46 for the first flow path 42 is arranged to surround the outlet 51 of the second flow path 43 at the first end 47. At the other end 49, the inlet 50 for the second flow path 43 is arranged to surround the outlet 48 of the first flow path 42. Thus, the heat exchange 40 is arranged such that the channels 42a, 42b, 42c, etc converge from a loop or ring-shaped inlet 46 to a substantially circular outlet 48, while the channels 43a, 43b, 43c etc converge from a loop or ring shaped inlet 50 to a substantially circular outlet 51. This arrangement results in a significant surface area through which heat transfer between the flow paths can occur. Further, the channels of the flow paths are brought into close contact, while a smooth, substantially non-turbulent flow flows through the heat exchange. This is particularly important as the heat exchange 40 will provide very little resistance to flow, and therefore does not require fan assistance, while maximising heat transfer efficiency. The gently curving flow path through the channels from the outside to the inside of the heat exchange 40 results in a substantially laminar flow through the heat exchange.

Figure 7:
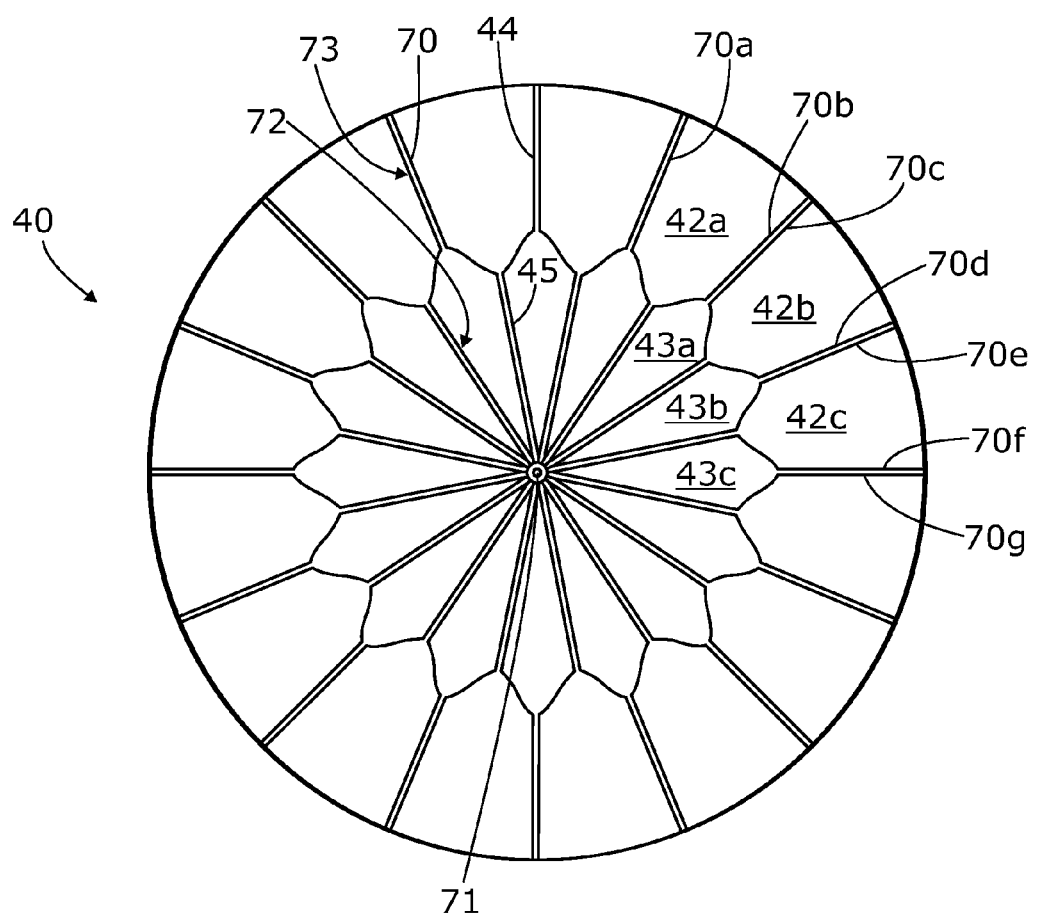
FIG. 7 shows a detailed view of an embodiment of a heat exchanger.

As shown in more detail in FIG. 7, the dividers 44, 45 are formed by a plurality of channel walls 70 that extend radially from a centre point 71. The channel walls are labelled in order from 70a to 70g in the Figure. Adjacent channel walls 70 are affixed together at particular points to form the channels 42a, 42b, 42c, 43a, 43b, 43c etc that form the first and second flow paths. Each wall 70 comprising an inner wall portion 72 and an outer wall portion 73, the inner wall portion 72 located closer to the centre point 71 than the outer wall portion 73. At a first end of the heat exchange 40 adjacent walls are arranged to be alternately connected over either their outer wall portion or their inner wall portion. Thus, the first wall 70a is joined to the adjacent second wall 70b along their inner wall portions 72. The next pair of adjacent walls, namely the second wall 70b and third wall 70c are joined together along their outer wall portions 73. The next pair of adjacent walls, namely the third wall 70c and the fourth wall 70d are joined together along their inner wall portions 72 and so on. Thus, adjacent pairs of adjacent walls are alternately joined along their inner wall portions 72 and then their outer wall portions 73.

This arrangement creates a plurality of openings to the channels of the first fluid flow path. The channels are formed between the joined outer wall portions, which form the dividers 44. Further, a plurality of openings to the separate channels that form the second fluid flow path are formed between the joined inner wall portions. The joined inner wall portions form the dividers 44.

As mentioned above, the first fluid flow path comprises a ring of channels that converge to the centre at the other end of the heat exchange. Likewise, the second fluid flow path comprises a substantially circular arrangement of channels that diverge to form a ring of channels at the other end. In order to achieve this, at the second, opposed end of the heat exchanger, the pairs of channel walls that were joined along their inner wall portions 72 at the first end are joined along their outer wall portions 73 at the second end. Similarly, the pairs of channel walls that were joined along their outer wall portions 73 at the first end are joined along their inner wall portions 72 at the second end.

Thus, at a second end, adjacent walls are arranged to alternately abut over either their outer wall portion or their inner wall portion, such that openings to the first set of channels are formed between the inner wall portions and openings to the second set of channels are formed between the outer wall portions.

In this embodiment, thirty two walls 70 are shown, but there could be more or less. Also, the walls 70 are affixed to one another over either their inner wall portion or outer wall portion only at the ends of the heat exchanger. Between the ends, the walls follow a smooth path to form a channel that guides air from the periphery to the centre or vice versa. The walls 70 are joined at the appropriate points by adhesive, although they may be welded or moulded to form the join.

Figure 6:
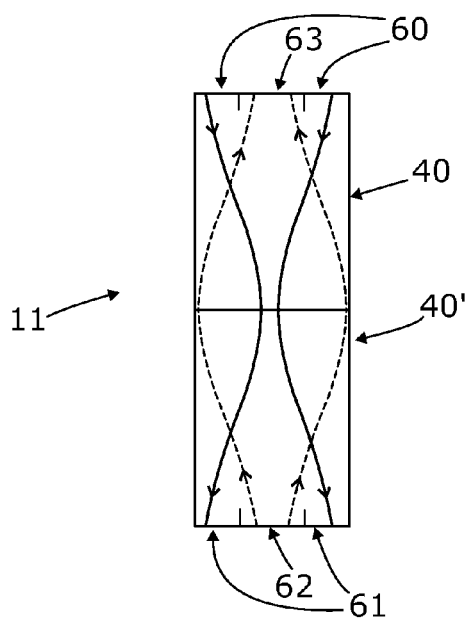
FIG. 6 shows a diagrammatic view of an embodiment of a heat recovery assembly.

The heat recovery assembly 11 is formed by two heat exchanges 40 (a first heat exchange and a second heat exchange) placed end to end. This is shown diagrammatically in FIG. 6. The second heat exchange 40' is of the same construction as the first heat exchange 40 but for ease of reference will be referred to as having a third and a fourth flow path rather than first and second flow paths. It will be appreciated that the direction of air flow through the third and fourth flow paths is reversed when compared to the first and second flow paths. Thus, in the second heat exchange 40', the inlet for a third flow path is surrounded by the outlet of a fourth flow path, and the inlet 62 of the fourth flow path is surrounded by the outlet 61 of the third flow path. The outlet 48 of the first flow path 42 is connected to the inlet of the third flow path and the outlet of the fourth flow path is connected to the inlet 50 of the second flow path 43. Thus, placing the two heat exchanges together, end to end, results in the first flow path and the third flow path being continuous and the second flow path and the fourth flow path being continuous.

Accordingly, the heat recovery assembly 11 comprises a peripheral ring-shaped inlet 60, which comprises the inlet of the first flow path through the first heat exchange 40. Air entering the peripheral inlet 60 will exit from the peripheral ring-shaped outlet 61, which comprises the outlet of the third flow path of the second heat exchange 40. The heat recovery assembly 11 also comprises a central, circular-shaped inlet 62, which comprises the inlet of the fourth flow path of the second heat exchange 40'. Air entering the central inlet 62 will exit from the central, circular-shaped outlet 63, which comprises the outlet 51 of the second flow path of the first heat exchange 40. Thus, the two heat exchangers provide an efficient and low resistance means for heat recovery and, due to their internal structure, a convenient arrangement of inlets and outlets for connection to ducting or the ventilation aperture element 10. It will be appreciated that the convenient arrangement of inlets and outlets for connection to ducting could be provided by a manifold connected to a single heat exchanger rather than using two heat exchangers.

The heat recovery assembly 11 is adapted to be mounted to the ventilation aperture element 10 such that the exhaust pipe 20 is connected to the central outlet 63. The funnel channels 21 are arranged in a ring shape that corresponds to the peripheral inlet 60. The heat recovery assembly 11 and ventilation aperture element 10 may be preassembled into a unit or may be coupled together on site.

The heat recovery assembly 11 is insulated and the cylindrical wall of each of the heat exchanges 40, 40' may be of flexible foam insulation.

To install the ventilation system 1, the chimney may be swept, if required, to ensure it is clean and then the chimney top 4 is prepared by removing the chimney pot. The outgoing air duct 12 is inserted through the chimney top 4 into the chimney void 7. A hole is made in the wall of the room to receive the outgoing air duct 12. The duct 12 is inserted through the hole and is secured therein with a vent 13. The other end of the outgoing air duct 12 is connected to the central inlet 62. The peripheral outlet 61 of the heat recovery assembly 11 is open to the chimney void 7. The heat recovery assembly 11 is inserted into the chimney void 7 through the chimney top 4. The heat recovery assembly 11 may have further insulation applied to it when mounted within the chimney top 4. In particular, the further insulation may extend into the chimney void such that the part of the chimney above the roof line is insulated and the heat recovery assembly sits within said insulation. The further insulation may comprise expanding foam. The ventilation aperture element 11 is then secured to the chimney top 4. The ventilation aperture element 11 is secured such that it seals against the chimney top 4. Thus, air can only enter or leave the ventilation system 1 via the funnels 22 and the exhaust pipe 20 respectively.

In use, the ventilation system operates passively, that is without powered movement of air through the system, as discussed above. The arrangement in the chimney void, the form of the heat recovery assembly 11 and the arrangement of the ventilation aperture element 10 all act to promote unhindered air flow through the ventilation system 1. The air, driven by the wind, flows through the cap flow path 31, which acts to draw the stale air through the heat recovery assembly 11 and the outgoing air duct 12. The gently curving path through the heat recovery assembly 11 does not hinder the air flow. Further, the funnels 15, efficiently direct a substantially laminar flow of air into the ventilation system 1. Again, the flow path through heat recovery assembly does not hinder the flow of incoming air into the chimney void 7. The fresh air entering the chimney void is warmed to approximately 90% of the outgoing air in the heat recovery assembly 11 and is forced down the chimney void 7 and through the chimney aperture 6. It will be appreciated that the chimney void is well insulated due to the insulation placed around the heat recovery assembly and therefore provides a convenient channel to bring the fresh air from outside into the building.

The heat exchanges described herein comprises circular, central inlets and outlets that are surrounded by ring-shaped inlets and outlets. However, it will be appreciated that the inlets and outlets could be of different shapes. For instance, the circular central inlets and outlets could be replaced with square inlets and outlets and therefore be surrounded by square loop-shaped inlets and outlets.

What is claimed is:

1. A ventilation system including a heat recovery assembly comprising a first heat exchanger for heat recovery having a first flow path and a second flow path, the first heat exchanger adapted to exchange heat energy from air transported in one of the first or second flow paths to the air transported in the other flow path, wherein a peripheral inlet to the first flow path is arranged to surround a central outlet of the second flow path, and a peripheral inlet to the second flow path is arranged to surround a central outlet of the first flow path, wherein the first flow path comprises a plurality of channels arranged in a loop at the peripheral inlet that converge to define the central outlet of the first flow path, wherein the second flow path comprises a plurality of channels arranged in a loop at the peripheral inlet that converge to define the central outlet of the second flow path, the plurality of channels of the first and second flow paths being defined by a plurality of radially extending dividers, and the plurality of channels of the first and second flow paths being arranged to cross over one another as they converge.

2. A ventilation system according to claim 1, in which the inlet for the first flow path is substantially annular and surrounds the outlet for the second flow path.

3. A ventilation system according to claim 1 or claim 2, in which the inlet for the second flow path is substantially annular and surrounds the outlet for the first flow path.

4. A ventilation system according to claim 1, in which the heat recovery assembly comprises the first heat exchanger and a second heat exchanger connected to the first heat exchanger in series, the second heat exchanger comprising a third flow path and a fourth flow path, the second heat exchanger adapted to exchange heat energy from the air transported in one of the third or fourth flow paths to the air transported in the other flow path, the inlet of the third flow path is surrounded by the outlet of the fourth flow path, and the inlet for the fourth flow path, which forms a central inlet, is surround by the outlet of the third flow path, which forms a peripheral outlet; the first and second heat exchangers being arranged such that the first flow path and the third flow path are continuous and the second flow path and the fourth flow path are continuous.

5. A ventilation system according to claim 4, in which the fourth and second flow paths are adapted to carry the air leaving the ventilation system to atmosphere and the first and third flow paths are adapted to carry the air entering the ventilation system from atmosphere.

6. A ventilation system according to claim 1, in which the ventilation system includes a ventilation aperture element providing an outlet for air leaving the ventilation system and an inlet to air entering the ventilation system, the ventilation aperture element having an exhaust pipe to channel air leaving the ventilation system and at least one funnel mounted around the periphery of the exhaust pipe for collecting air to enter the ventilation system, the at least one peripheral funnel adapted to be connected to the inlet of the first flow path and the exhaust pipe adapted to connect to the outlet of the second flow path.

7. A ventilation system according to claim 6, in which the ventilation aperture element includes a cap element adjacent but spaced from an opening of the exhaust pipe, the cap element including a projection that projects towards the opening of the exhaust pipe.

8. A ventilation system according to claim 6, in which the ventilation system is adapted to be mounted within a chimney of a building, the chimney comprising a chimney top adjacent the roof of the building and at least one chimney aperture that opens into a room of the building, the chimney aperture and chimney top being connected by a chimney void, the heat recovery assembly adapted to be received within the chimney void and the ventilation aperture element adapted to be sealingly connected to the chimney top.

9. A ventilation system according to claim 4, in which the inlet of the fourth flow path is adapted to be connected to an outgoing air duct which receives air from a room in the building.

10. A ventilation system according to claim 4, in which the outlet of the third flow path is adapted to be open to a chimney void.

11. A heat exchanger for a heat recovery ventilation system having a first flow path and a second flow path, the heat exchanger adapted to exchange heat energy from air transported in one of the first or second flow paths to the air transported in the other flow path, wherein a peripheral inlet to the first flow path is arranged to surround a central outlet of the second flow path, and a peripheral inlet to the second flow path is arranged to surround a central outlet of the first flow path, wherein the first flow path comprises a plurality of channels arranged in a loop at the peripheral inlet, the plurality of channels arranged to converge to define the central outlet of the first flow path, wherein the second flow path comprises a plurality of channels arranged in a loop at the peripheral inlet that converge to define the central outlet of the second flow path, the plurality of channels of the first and second flow paths being defined by a plurality of radially extending dividers, and the plurality of channels of the first and second flow paths being arranged to cross over one another as they converge.

12. A heat exchanger according to claim 11, in which the heat exchanger is cylindrical.

13. A heat exchanger according to claim 11 or claim 12, in which the inlet for the first flow path is ring-shaped and surrounds the circular outlet of the second flow path, and the inlet for the second flow path is ring-shaped and surrounds the outlet of the first flow path.

14. A ventilation system according to claim 1, in which the first heat exchanger is cylindrical.

15. A ventilation system according to claim 1, in which the plurality of channels of the first flow path, at the central outlet, are separated from one another by the plurality of radial dividers; and the plurality of channels of the second flow path, at the central outlet, are separated from one another by the plurality of radial dividers.

16. A ventilation system according to claim 1, in which the plurality of channels of the first flow path, at the peripheral inlet, are separated from one another by the plurality of radial dividers; and the plurality of channels of the second flow path, at the peripheral inlet, are separated from one another by the plurality of radial dividers.

17. A ventilation system according to claim 1, in which the plurality of channels of the first flow path, at the peripheral inlet, are substantially shaped as sectors of an annulus and arranged together to form the loop; and the plurality of channels of the second flow path, at the peripheral inlet, are substantially shaped as sectors of an annulus and arranged together to form the loop.

* * * * *